(12) United States Patent
LeBeau

(10) Patent No.: US 11,807,333 B2
(45) Date of Patent: Nov. 7, 2023

(54) INSERT STORAGE DEVICE

(71) Applicant: LEBEAU INC., Logan, UT (US)

(72) Inventor: Mark LeBeau, Logan, UT (US)

(73) Assignee: LEBEAU INC., Logan, UT (US)

( * ) Notice: Subject to any disclaimer, the term of this patent is extended or adjusted under 35 U.S.C. 154(b) by 283 days.

(21) Appl. No.: 17/505,467

(22) Filed: Oct. 19, 2021

(65) Prior Publication Data

US 2023/0124001 A1    Apr. 20, 2023

(51) Int. Cl.
*B62J 9/20* (2020.01)
*B62J 9/40* (2020.01)
*B62K 21/12* (2006.01)
*B65D 51/28* (2006.01)

(52) U.S. Cl.
CPC .............. *B62K 21/12* (2013.01); *B62J 9/20* (2020.02); *B62J 9/40* (2020.02); *B65D 51/28* (2013.01)

(58) Field of Classification Search
CPC ..................................... B62J 9/20; B62J 9/40
USPC ......... 220/475, 23.89, 23.87, 500, 503, 523, 220/553, 661
See application file for complete search history.

(56) References Cited

U.S. PATENT DOCUMENTS

| | | | |
|---|---|---|---|
| 4,716,502 A | 12/1987 | Schott et al. | |
| 5,083,108 A * | 1/1992 | Guest | B62K 21/26 340/432 |
| 5,845,816 A * | 12/1998 | Krane | B65D 25/04 222/480 |
| 5,950,498 A | 9/1999 | Gossett et al. | |
| 6,070,897 A * | 6/2000 | Hsieh | B62J 9/40 74/564 |
| 6,564,982 B1 | 5/2003 | Woods et al. | |
| 9,101,818 B2 * | 8/2015 | Carr | A63C 11/227 |
| 9,649,443 B2 * | 5/2017 | Klintenstedt | A61M 5/24 |
| 9,656,716 B2 * | 5/2017 | DeGray | B62K 19/32 |
| 9,908,227 B1 * | 3/2018 | Yin | B25G 1/08 |
| 10,197,049 B2 * | 2/2019 | Staples | B62J 11/02 |
| 10,399,631 B2 | 9/2019 | DeGray | |
| 10,883,481 B2 * | 1/2021 | Staples | B62K 19/32 |
| 10,940,908 B1 * | 3/2021 | Gu | B29C 73/08 |
| 11,511,824 B2 * | 11/2022 | Moechnig | B62K 19/30 |

(Continued)

FOREIGN PATENT DOCUMENTS

DE        9014691 U1     2/1991
DE    102017115569 B4    12/2019

(Continued)

OTHER PUBLICATIONS

Staff, State Bicycle Co, Online Product Listing, Apr. 20, 2019, https://bikerumor.com/2019/04/20/celebrate-4-20-with-these-cycling-themed-kits-tools-bar-tape-more/.

(Continued)

*Primary Examiner* — Justin M Larson
(74) *Attorney, Agent, or Firm* — Preston P. Frischknecht; Project CIP

(57) ABSTRACT

An insert storage device for storing items inside a generally cylindrical passage such as a handlebar or pole. The device has a first end, a second end, and an elongate portion joining the first and second ends. The elongate portion has a storage compartment configured to store a removable pipe. The first end creates an interference fit between the insert storage device and the generally cylindrical passage, and the second end has a separate storage compartment with a movable cap that provides access.

18 Claims, 8 Drawing Sheets

(56) References Cited

U.S. PATENT DOCUMENTS

| | | |
|---|---|---|
| 2018/0057093 A1 | 3/2018 | Lenig |
| 2021/0061403 A1 | 3/2021 | Graetz |
| 2021/0079903 A1 | 3/2021 | Staples |
| 2021/0197920 A1* | 7/2021 | Bacon .................. B62J 9/21 |

FOREIGN PATENT DOCUMENTS

| | | |
|---|---|---|
| DE | 102019006198 A1 | 3/2021 |
| WO | WO2021104546 | 6/2021 |

OTHER PUBLICATIONS

Pentabike, Pentabike, Online Product Listing, 2017, https://pentabike.net/product/black-n-brass/.
Iozzio Cycles, Iozzio Cycles, Online Product Listing, Aug. 30, 2021, https://www.iozzio.life/parts/wf4lzp6h5wly4gtynqpxt8oer6so9w.
Amazon.com, Lezyne, Online Product Listing, Aug. 31, 2021, https://www.amazon.com/LEZYNE-Tool-Insert-Kit-Black/dp/B08NTJ3MVL.

* cited by examiner

INSERT STORAGE DEVICE

BACKGROUND

The outdoor gear and equipment market grows at an above-average pace as each year more people buy bicycles, motorcycles, all-terrain vehicles, tents, skis, and the like. This pace has been accelerated by such global events as the recent Covid-19 pandemic, which has generally caused more at-home and leisure time, accompanied by outdoor exploration and experiences. One tenet of outdoor gear and equipment is optimizing storage. This may be done by making gear elements smaller, lighter, or more modular. Aftermarket devices designed to nest within the structure of other products is a seldom explored design solution for optimizing storage in outdoor gear and equipment.

The need for aftermarket devices designed to nest within the structure of other products—and outdoor gear and equipment in particular—overlaps with the proliferation of and demand for *cannabis*-based products. By way of background, medical use of *cannabis* is currently legal in 36 states and the recreational use of *cannabis* is legalized in 18 states. Another 13 states have decriminalized its use. *Cannabis*-based industries are growing exponentially and more consumers than ever, including outdoor enthusiasts, are shopping for *cannabis*-based products and accessories. One example of unfilled need in this context is that for devices to store *cannabis* conveniently within the structure of commonly used outdoor gear and equipment such as bicycle handlebars, motorcycle handlebars, all-terrain vehicle handlebars, vehicle handlebars, tent poles, ski poles, trekking poles, hiking poles and the like.

SUMMARY OF THE INVENTION

In accordance with the above, a new insert storage device is provided that includes: a first end; a second end; an elongate portion joining the first and second ends, the elongate portion having a first storage compartment configured to store a pipe; where the insert storage device is configured to be inserted into a generally cylindrical passage. In some embodiments of the insert storage device: the first end has a means for creating an interference fit between the insert storage device and the generally cylindrical passage; the second end has a first storage compartment with a movable cap for providing access to the first storage compartment; and the elongate portion has a second storage compartment with a substantially open first side for housing a removably attachable pipe configured to nest inside the second storage compartment.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the use of the accompanying drawings in which.

DETAILED DESCRIPTION OF THE ILLUSTRATED EMBODIMENT

The present invention in its various embodiments, some of which are depicted in the figures herein, is an insert storage device.

Figure 1:
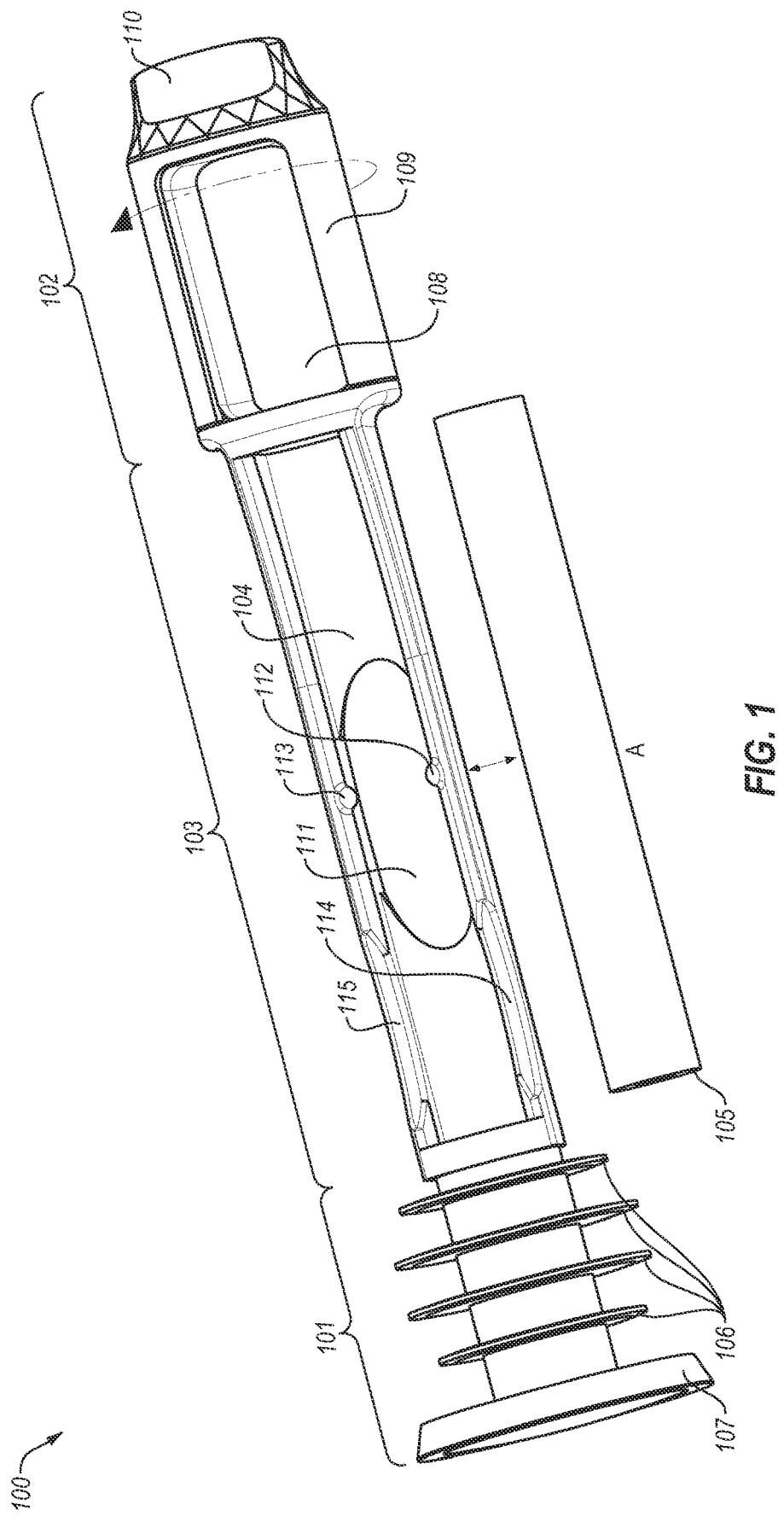
FIG. 1 is a perspective, partially exploded view of a first embodiment of an insert storage device.
Figure 2:
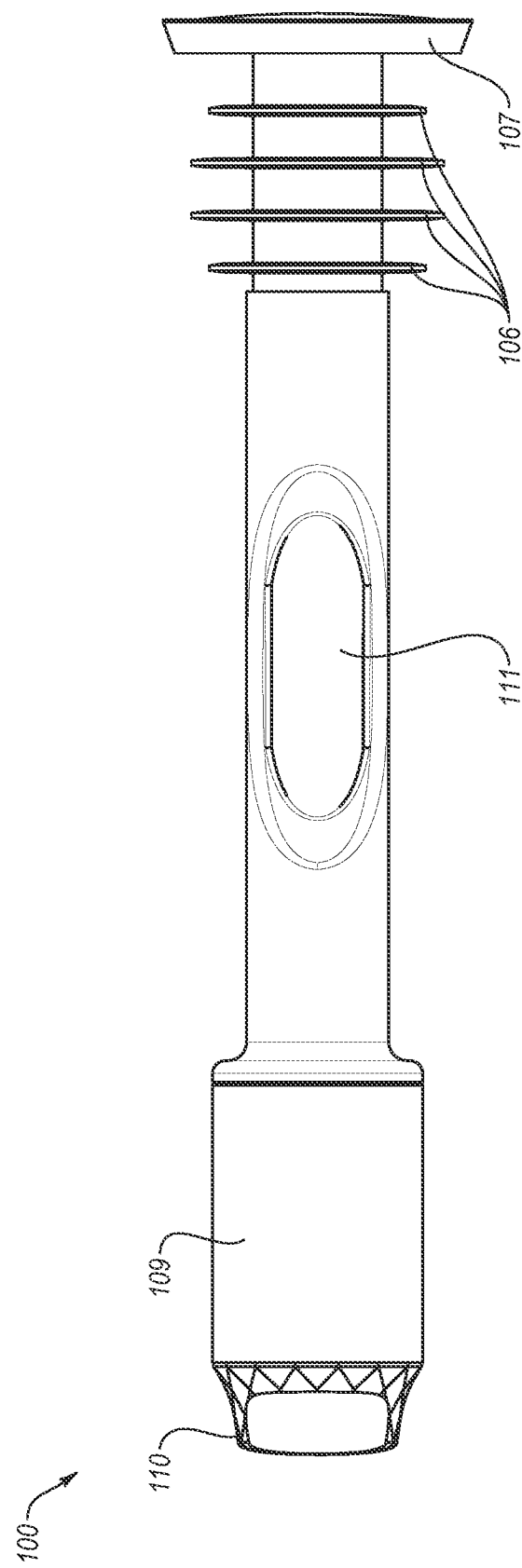
FIG. 2 is a top view of a first embodiment of an insert storage device.
Figure 3:
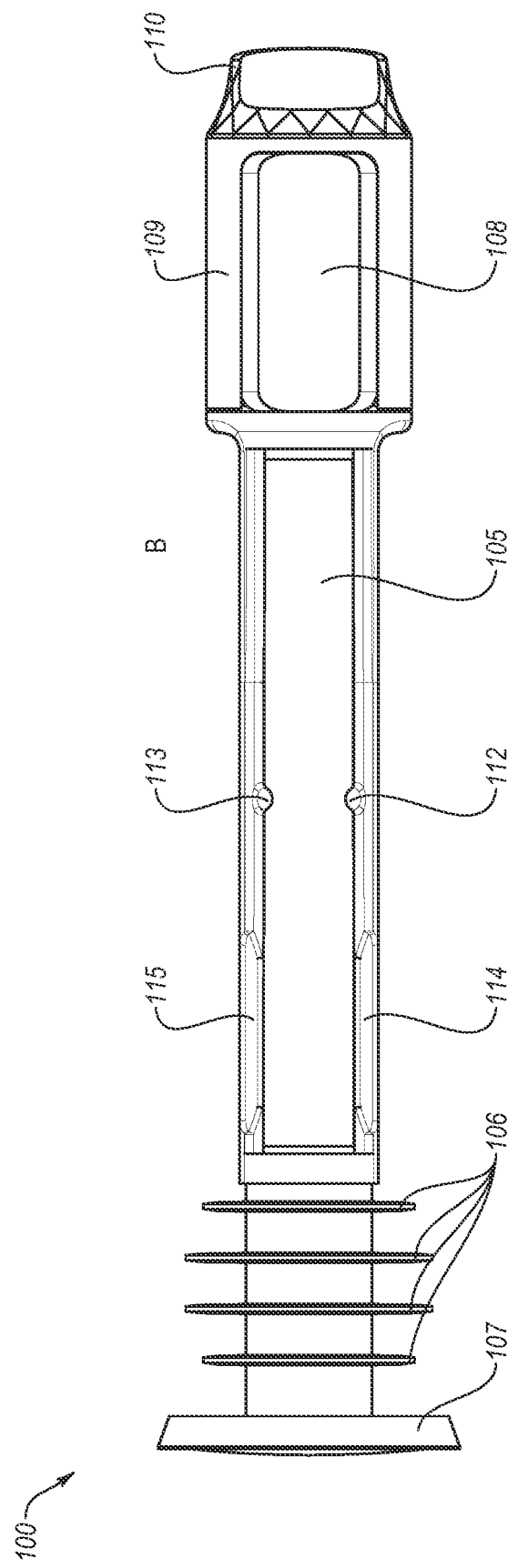
FIG. 3 is a bottom view of a first embodiment of an insert storage device.
Figure 4:
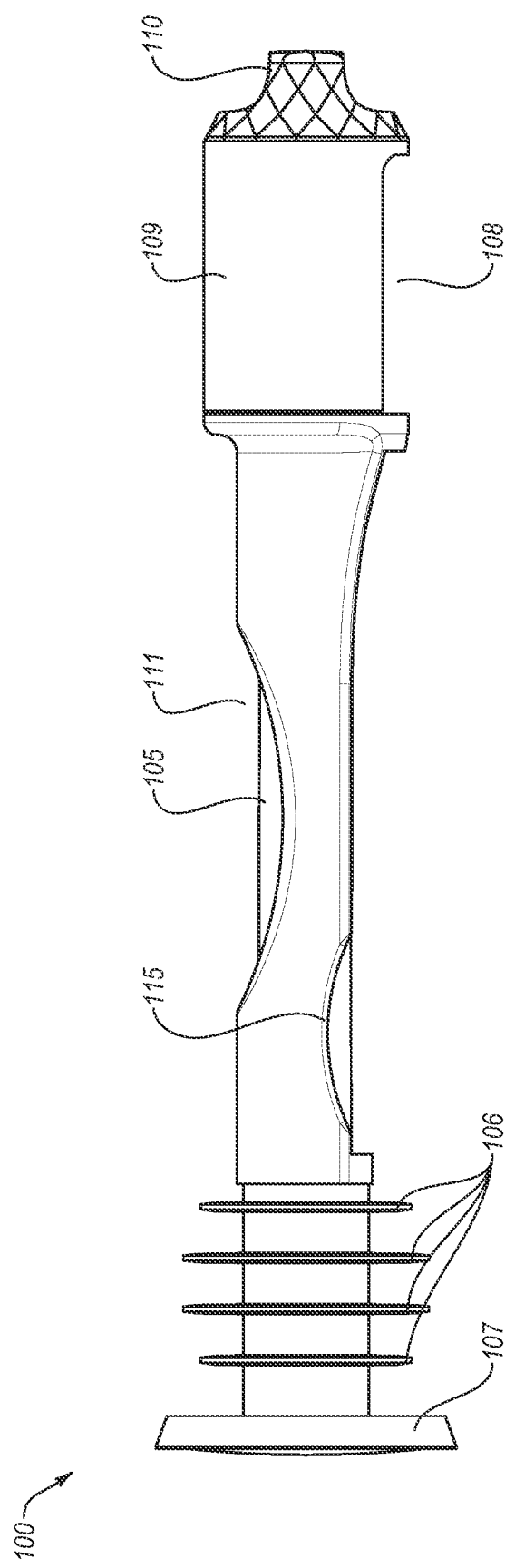
FIG. 4 is a side view of a first embodiment of an insert storage device.

Referring now to FIGS. 1 through 4, a first embodiment of an insert storage device 100 is shown. Insert storage device 100 is configured to be inserted into a generally cylindrical passage. Examples of such a passage include structures like bicycle handlebars, motorcycle handlebars, all-terrain vehicle handlebars, vehicle handlebars, tent poles, ski poles, trekking poles, hiking poles and the like.

Insert storage device 100 includes a first end 101, a second end 102, and an elongate portion 103 joining the first 101 and second 102 ends. The first end 101 has a means for creating an interference fit between the insert storage device 100 and the generally cylindrical passage for removeably retaining the insert storage device 100 within the generally cylindrical passage. Such means may include a plurality of fins 106 and/or a singular fin and/or end cap 107 or similar structure. Fins and/or end caps may be oriented parallel, perpendicular, or angled with respect to a longitudinal axis of the elongate portion. The second end 102 may have a storage compartment 108 with a cap 109. In the illustrated embodiment, the cap 109 is attached at the second end 102 and rotates to provide access to the second end storage compartment 108 by incorporating an aperture on an otherwise generally walled side of the cap 109. Cap 109 may also have a raised knob 110 or other grip or grasp features to facilitate a user's rotation of the cap 109 and/or access to the second end storage compartment 108.

The elongate portion 103 also has a storage compartment 104 configured to store a generally cylindrical member 105 such as a pipe. In preferred embodiments the elongate portion storage compartment 104 and the second end storage compartment 108 are completely separated, including by a wall between or adjacent to the elongate portion 103 and second end 102 and/or other means. Generally cylindrical member 105 may be releasably attachable to the elongate portion 103. Elongate portion 103 may have a substantially open side to facilitate movement of the generally cylindrical member 105 to and from a nested position B (see FIG. 3) inside the elongate portion storage compartment 104.

In the illustrated embodiment, the elongate portion 103 may include one or more protrusions 112, 113 inside the elongate portion storage compartment 104 for creating a retention such as a snap fit with the generally cylindrical member 105. In some embodiments, the elongate portion 103 may have an aperture 111 on an opposing side from the substantially open side that is configured to allow a user to initiate movement of the generally cylindrical member 105 from the nested position B inside the elongate member storage compartment 104. In this manner, the generally cylindrical member 105 may be removed (see A, FIG. 1) from the elongate portion 103. Elongate portion 103 may also incorporate other curved edges 114, 115 and/or apertures.

Figure 5:
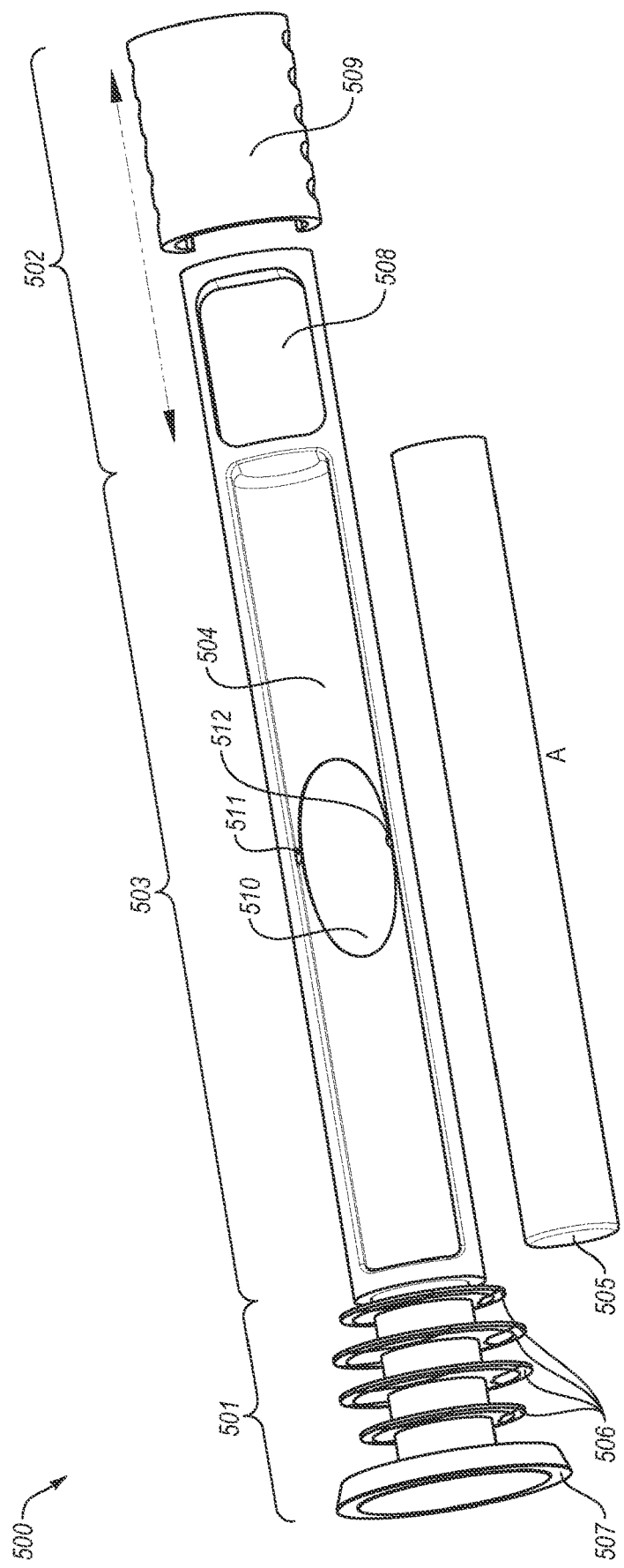
FIG. 5 is a perspective, exploded view of a second embodiment of an insert storage device.
Figure 6:
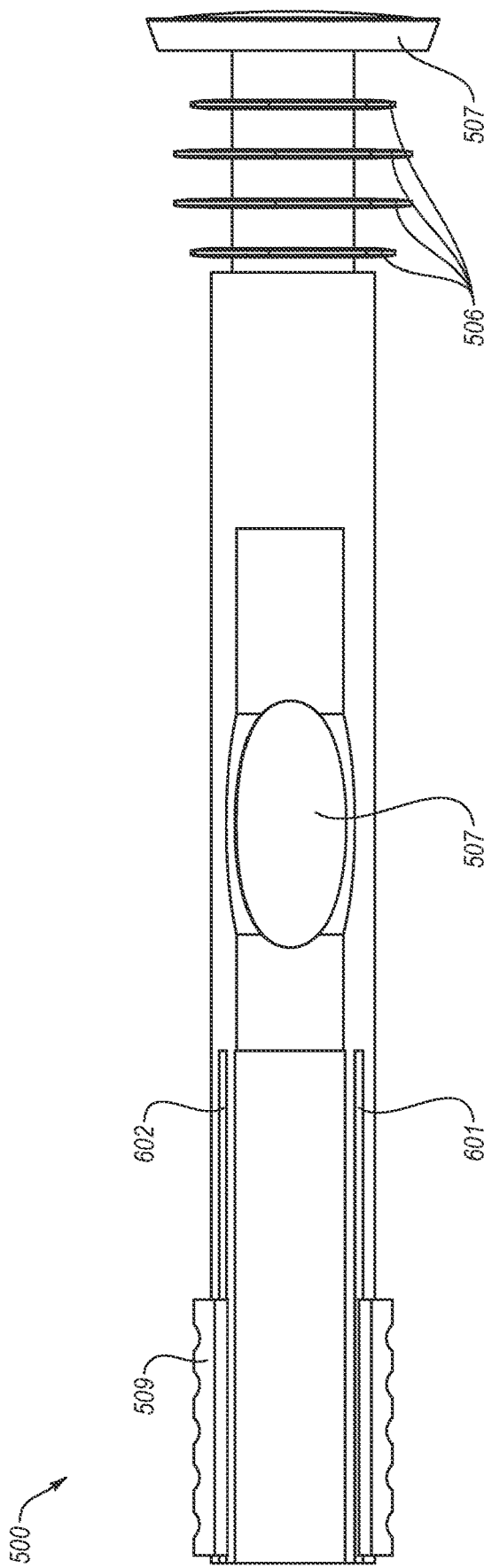
FIG. 6 is a top view of a second embodiment of an insert storage device.
Figure 7:
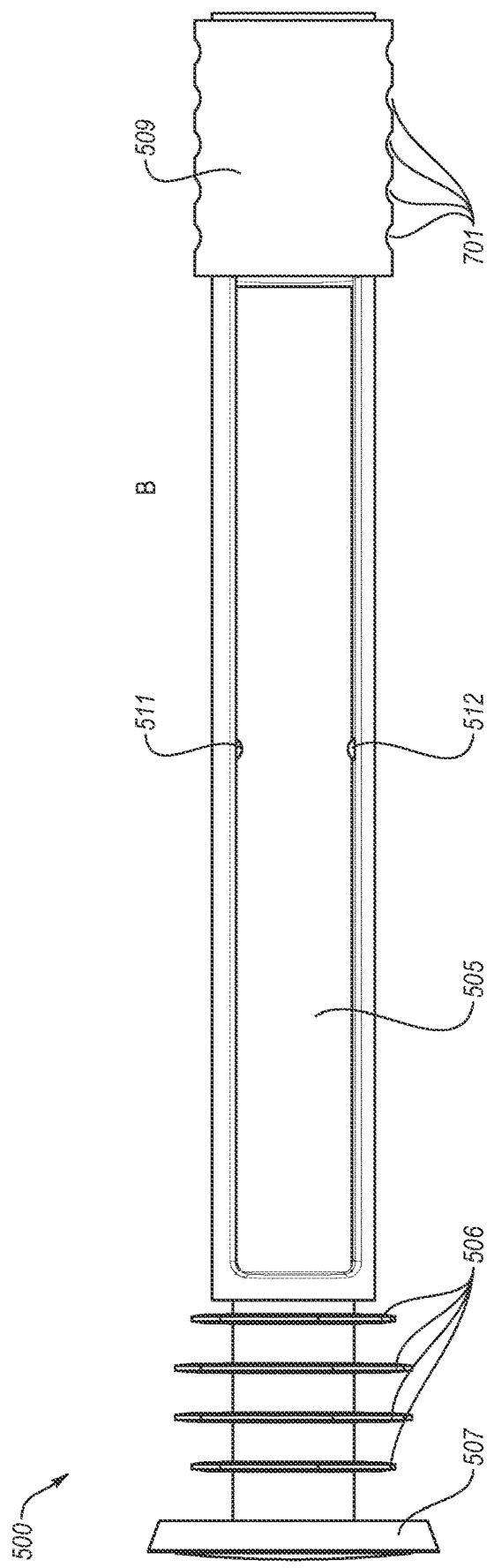
FIG. 7 is a bottom view of a second embodiment of an insert storage device.
Figure 8:
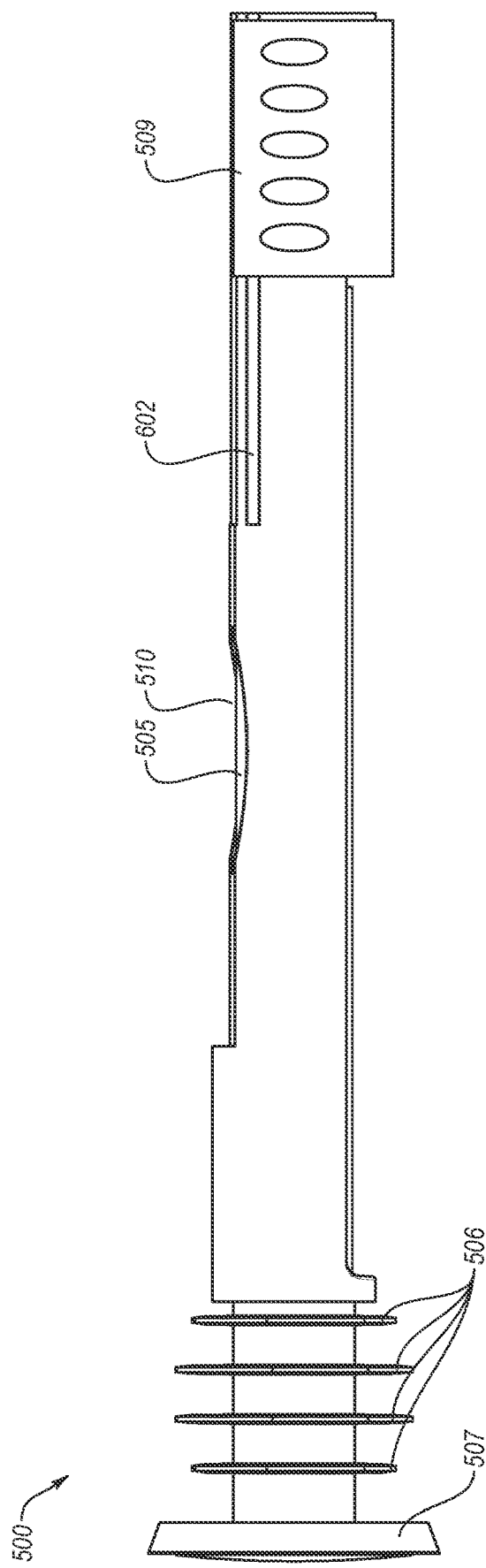
FIG. 8 is a side view of a second embodiment of an insert storage device.

Referring now to FIGS. 5 through 8, a second embodiment of an insert storage device 500 is shown. As with the first embodiment, insert storage device 500 is configured to be inserted into a generally cylindrical passage. Insert storage device 500 includes a first end 501, a second end 502, and an elongate portion 503 joining the first 501 and second 502 ends. The first end 501 has a means for creating an interference fit between the insert storage device 500 and the generally cylindrical passage for removeably retaining the insert storage device 500 within the generally cylindrical passage. Such means may include a plurality of fins 506 and/or a singular fin and/or end cap 507 or similar structure. Fins and/or end caps may be oriented parallel, perpendicular, or angled with respect to a longitudinal axis of the elongate portion. The second end 502 may have a storage compartment 508 with a cap 509. In the illustrated embodiment, the cap 509 is attached at the second end 502 and slides on a rail-and-track 601, 602 (see FIG. 6) to provide access to the second end storage compartment 508. Cap 509 may also have grooves 701 or other grip or grasp features to facilitate a user's sliding of the cap 509 and/or access to the second end storage compartment 508.

The elongate portion 503 also has a storage compartment 504 configured to store a generally cylindrical member 505 such as a pipe. In preferred embodiments the elongate portion storage compartment 504 and the second end storage compartment 508 are completely separated, including by a wall between or adjacent to the elongate portion 503 and second end 502 and/or other means. Generally cylindrical member 505 may be releasably attachable to the elongate portion 503. Elongate portion 503 may have a substantially open side to facilitate movement of the generally cylindrical member 105 to and from a nested position B (see FIG. 7) inside the elongate portion storage compartment 504.

In the illustrated embodiment, the elongate portion 503 may include one or more protrusions 511, 512 inside the elongate portion storage compartment 504 for creating a retention such as a snap fit with the generally cylindrical member 505. In some embodiments, the elongate portion 503 may have an aperture 510 on an opposing side from the substantially open side that is configured to allow a user to initiate movement of the generally cylindrical member 505 from the nested position B inside the elongate member storage compartment 504. In this manner, the generally cylindrical member 505 may be removed (see A, FIG. 5) from the elongate portion 103.

Other embodiments of the insert storage device may incorporate slightly different designs without departing from the essential scope of the invention. For example, embodiments may have a plug-type cap wherein a portion of the cap has a diameter that is smaller than the elongate portion so as to fit within it for closing and accessing the second end storage compartment. Other embodiments may include, but are not limited to, screw caps, locking caps, magnetic caps, and the like. Any cap type for closing and providing access to the second end storage compartment may be suitable.

So, configured, the invention includes a new insert storage device. The problem of creating an aftermarket device designed to nest within the structure of other products and optimizing storage in outdoor gear and equipment is solved through an insert storage device, with storage compartments, configured to stow into a generally cylindrical passage and be removably retained there by interference fit means. While the insert storage device is suitable for storing *cannabis* conveniently within the structure of handlebars and poles, it may be understood that the device is also suitable for storing many different types of objects and/or materials within many different types of structures.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An insert storage device comprising:
   a first end;
   a second end;
   an elongate portion joining the first and second ends, the elongate portion having a first storage compartment configured to store a storage pipe; and a second storage compartment, a barrier separating the first and second storage compartments; the elongate portion further substantially open on a first side to facilitate movement of the pipe to and from a nested position inside the first storage compartment; and;
   the insert storage device configured to be inserted into a generally cylindrical passage.

2. The insert storage device of claim 1, further having a removably attachable pipe configured to nest inside the storage compartment.

3. The insert storage device of claim 2, the elongate portion having an aperture on a second side configured to allow a user to push the pipe from a nested position.

4. The insert storage device of claim 2, the elongate portion further having one or more protrusions inside the first storage compartment for creating a snap fit with the pipe.

5. The insert storage device of claim 1, the first end having a means for creating an interference fit between the insert storage device and a generally cylindrical passage.

6. The insert storage device of claim 1, further comprising a rotating cap for providing access to the second storage compartment, the rotating cap attached to the insert storage device adjacent to the second end.

7. The insert storage device of claim 1, further comprising a sliding cap for providing access to the second storage compartment, the sliding cap attached to the insert storage device adjacent to the second end.

8. The insert storage device of claim 1, configured to be placed into one or more of: a bicycle handlebar, a motorcycle handlebar, an all-terrain vehicle handlebar, vehicle handlebar, a tent pole, a ski pole, a trekking pole, and a hiking pole.

9. An insert storage device comprising:
   a first end having a means for creating an interference fit between the insert storage device and a generally cylindrical passage;
   a second end having a first storage compartment;
   a moveable cap for providing access to the first storage compartment, the movable cap attached to the insert storage device adjacent to the second end;
   an elongate portion joining the first and second ends, the elongate portion having a second storage compartment with a substantially open first side; and
   a removably attachable pipe configured to nest inside the second storage compartment.

10. The insert storage device of claim 9, the moveable cap rotatable for accessing the first storage compartment.

11. The insert storage device of claim 9, the moveable cap slidable for accessing the first storage compartment.

12. The insert storage device of claim 9, the elongate portion having an aperture on a second side configured to allow a user to push the pipe from a nested position.

13. The insert storage device of claim 9, the elongate portion further having one or more protrusions inside the second storage compartment for creating a snap fit with the pipe.

14. The insert storage device of claim 9, configured to be placed into one or more of: a bicycle handlebar, a motorcycle handlebar, an all-terrain vehicle handlebar, vehicle handlebar, a tent pole, a ski pole, a trekking pole, and a hiking pole.

15. An insert storage device comprising:
a first end with a plurality of fins for creating an interference fit between the insert storage device and a generally cylindrical passage;
a second end having a first storage compartment;
a movable cap for providing access to the first storage compartment and attached adjacent to the second end;
an elongate portion joining the first and second ends, the elongate portion having a second storage compartment with a substantially open first side,
an aperture on a second side, and
one or more protrusions inside the second storage compartment;
a removably attachable pipe configured to nest inside the second storage compartment through a snap fit with the one or more protrusions, and be removed from the second storage compartment through the substantially open first side of the elongate portion, the aperture on the second side of the elongate portion configured to allow a user to push the pipe from a nested position.

16. The insert storage device of claim 15, the moveable cap rotatable for accessing the first storage compartment.

17. The insert storage device of claim 15, the moveable cap slidable for accessing the first storage compartment.

18. The insert storage device of claim 15, configured to be placed into one or more of: a bicycle handlebar, a motorcycle handlebar, an all-terrain vehicle handlebar, vehicle handlebar, a tent pole, a ski pole, a trekking pole, and a hiking pole.

* * * * *